US006421475B1

(12) United States Patent
Engelhardt et al.

(10) Patent No.: US 6,421,475 B1
(45) Date of Patent: Jul. 16, 2002

(54) OVERLOAD PROTECTION SYSTEM FOR AVOIDING DAMAGE TO OPTICAL COMPONENTS

(75) Inventors: Johann Engelhardt, Bad Schönborn; Heinrich Ulrich, Heidelberg, both of (DE)

(73) Assignee: Leica Microsystems Heidelberg GmbH, Heidelberg (DE)

( * ) Notice: Subject to any disclaimer, the term of this patent is extended or adjusted under 35 U.S.C. 154(b) by 0 days.

(21) Appl. No.: 09/402,340

(22) PCT Filed: Feb. 18, 1999

(86) PCT No.: PCT/DE99/00452

§ 371 (c)(1),
(2), (4) Date: Oct. 5, 1999

(87) PCT Pub. No.: WO99/42878

PCT Pub. Date: Aug. 26, 1999

(30) Foreign Application Priority Data

Feb. 19, 1998 (DE) .......................... 198 06 866

(51) Int. Cl.⁷ .................. G02B 6/26; G02B 6/42
(52) U.S. Cl. ................ 385/15; 250/205; 606/612
(58) Field of Search ................ 250/205, 201; 372/29, 31; 606/12; 385/15

(56) References Cited

U.S. PATENT DOCUMENTS

| 4,378,490 A | * | 3/1983 | d'Auria ...................... 250/201 |
| 4,443,696 A | * | 4/1984 | Taboada ...................... 250/205 |
| 4,543,477 A | | 9/1985 | Doi et al. |
| 4,928,284 A | * | 5/1990 | Burns ........................... 372/31 |
| 4,994,059 A | * | 2/1991 | Kosa et al. ................... 606/12 |
| 5,057,099 A | * | 10/1991 | Rink ........................... 606/12 |
| 5,134,273 A | * | 7/1992 | Wani et al. ................. 250/205 |
| 5,157,676 A | * | 10/1992 | Wilcox ........................ 372/29 |
| 5,357,097 A | * | 10/1994 | Shiozawa et al. ........... 250/205 |

FOREIGN PATENT DOCUMENTS

| EP | 0 245 552 | 11/1987 |
| EP | 0 329 492 | 8/1989 |

* cited by examiner

*Primary Examiner*—Hemang Sanghavi
*Assistant Examiner*—Scott A Knauss
(74) *Attorney, Agent, or Firm*—Simpson & Simpson, PLLC

(57) ABSTRACT

An overload protection to avoid damage to optical components (3) by excessive light power from a light source (2), especially to protect a glass fiber system used to transmit laser light (5), has a beam splitter out (4) in the beam path (6) between the light source (2) and the optical component (3) to couple out a small portion of the light, a detector (7) to detect the light intensity of the light coupled out, an electronic evaluation unit (8) to compare the detected light intensity with a presettable maximum value, and a filter or other element (9) to reduce the light power or to cut off the light incident on the optical component (3) in case the maximum value is exceeded.

9 Claims, 1 Drawing Sheet

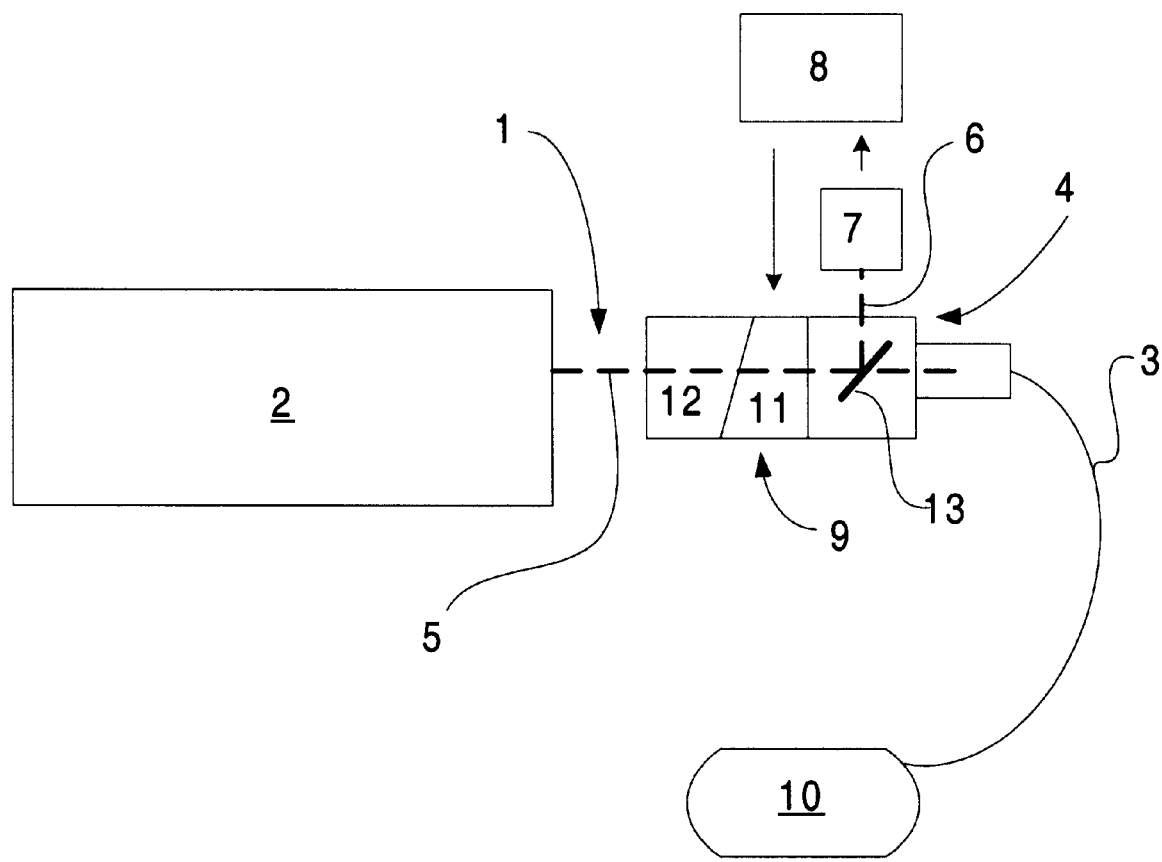
FIG.

OVERLOAD PROTECTION SYSTEM FOR AVOIDING DAMAGE TO OPTICAL COMPONENTS

BACKGROUND OF THE INVENTION

The invention relates to overload protection to avoid damage to optical components because of excessive light power from a light source, particularly to protect a glass fiber system used to transmit laser light.

The optical components or systems here to be protected from destruction by excessive light power are, for instance, glass fiber systems to transmit laser light to a measurement system. Such glass fiber systems are used in confocal microscopy, among other applications. Lasers which have great intensity differences among the individual lines, are often used, so that the total laser power must be set extremely high so that individual weak lines can also be excited. With such lasers, then, the total output power may be so high as to exceed the threshold for destruction of the glass fiber system. In any case, lasers with multiple wavelengths have high light power at the laser output, in the range of 2 to 3 watts. If the threshold for destruction of a glass fiber system is exceeded by the laser beam coupled into it, one speaks of the "death" of the fiber, as the fiber inlet is actually burned up.

SUMMARY OF THE INVENTION

The invention is, therefore, based on the problem of designing and developing overload protection to avoid damage to optical components by excessive light power from a light source, especially for protection of a glass fiber system used to transmit laser light, such that adequate protection of the optical components stressed by laser light is achieved with simple means and without turning off the light source. With respect to a glass fiber system as the optical component, burning of the fiber inlet should be avoided.

The overload protection according to the invention of the type under discussion here solves the problem stated above. According to that, the overload protection to avoid damage to optical components by excessive light power from a light source involves a means to couple out a small portion of the light, a detector to detect the intensity of the light coupled out, an electronic evaluation unit to compare the detected light intensity with a presettable maximum or threshold value, and a means to reduce the light power or to cut off the light incident on the optical component in case the maximum value is exceeded.

It is recognized according to the invention that the optical component can be protected by detecting the intensity or power of the light directly in its beam path; but here it is suggested that a small portion of the light be coupled out of the beam path. The small portion of the light coupled out is detected with respect to the light intensity and compared, in an electronic evaluation unit, with a preset maximum value. This maximum value must, obviously, refer to the ability of the optical component to carry a photooptical load. In the case of a laser being coupled into a light fiber, the maximum value of the light intensity or light power must be below a value that will damage the light fiber. Finally, the means to couple out the light, the detector, and the means to reduce the light power or to cut off the light incident on the optical component make up a control loop which then acts on the beam path directed onto the optical component if the preset maximum value for the light intensity is exceeded.

The means to reduce the light power or cut off the light incident on the optical component can act in various ways. For instance, it is possible for the means to reduce the light power to dim or throttle the light source directly or, in the extreme case, actually turn it off, in which case one can define a complete shutoff as "emergency off". In a very particularly advantageous way, though, it is possible to design the means to reduce the light power as a filter placed between the light source and the optical component. It may also be a filter combination. This filter combination could, for example, comprise filter wheels or similar design measures. In any case, the filter or filter combination should assure that it is possible to reduce the light intensity or light power incident on the optical component, depending on the detected light power.

As part of an alternative embodiment, the means to reduce the light power could be designed as an acousto-optical filter (AOTF=acousto optical tunable filter) placed in the beam path between the light source and the optical component. Thus the primary light or laser beam would have its amplitude attenuated by the electronic control of the AOTF to an amplitude below the maximum value, and thus to a non-dangerous intensity value.

It is also conceivable for the means to reduce the light power to involve a mechanical shutoff unit, a shutter, between the light source and the optical component. If the maximum value established for the light intensity is exceeded, the primary light beam would be blocked by the mechanical shutter, thus assuring protection of the optical component with simple means.

As noted above, an out-coupling means which couples out a small proportion of the light incident on the optical component is provided for detection of the light intensity. This out-coupling means could be designed as a beam splitter. In an actual case it could be a thin glass beam splitter plate, that is, a thin glass plate. Such a thin plate is particularly suitable as a beam splitter, because such a plate, without any other coating, is already usable for partial reflection of about 4% to 6% of the incident light. A comparable range, from about 4% to 6%, preferably 5% of the light beam, should be coupled out for detection of the light intensity.

The out-coupling means and the means for reducing the light power could be combined into a structural unit in the beam path of the light in a particularly advantageous manner, especially with respect to compact construction. Both means can be arranged in a single housing which provides one light input and two light outputs, one for the primary light beam and another for the light coupled out.

It is also particularly important for the detector for detecting the light intensity or light power of the light coupled out to be calibrated with the split ratio, that is, primary light beam/out-coupled light, taken into consideration so as to be able to draw conclusions about the actual light intensity of the primary light beam.

BRIEF DESCRIPTION OF THE DRAWING

Now there are various ways for embodying and developing the teaching of this invention in an advantageous manner. Reference is made, and to the following explanation of one example embodiment of the invention by means of the drawing. Generally preferred embodiments and developments of the teaching will also be explained in connection with the explanation of the preferred embodiment of the invention.

FIG. 1 shows:

a schematic diagram of the essential arrangement of an overload protection according to the invention for avoiding damage to optical components, with the optical component being a light-conductive fiber or a glass fiber and with the light source being a laser light source.

DETAILED DESCRIPTION OF THE PREFERRED EMBODIMENTS

According to the figure, the overload protection involves an out-coupling means 4 in the beam path 1 between a laser light source 2 and a glass fiber 3, to couple out a small portion of the primary laser light 5. In addition, a detector 7 to detect the light intensity or light power of the out-coupled light is provided in beam path 6. The detector 7 is followed by an electronic evaluation unit 8 to compare the detected light intensity with a presettable maximum value. Finally, a means 9,11 to reduce, or to cut off entirely 9,12 the laser light 5 incident on the glass fiber 3 is provided in case the presettable maximum value is exceeded.

The figure shows that the out-coupling means 4, the detector 7, the evaluation unit 8, and finally, the means 9 to reduce the light power make up a control loop. In any case, the overload protection described above assures that the glass fiber 3 leading to a system 10, such as a microscope, is effectively protected against excessive light power in the laser light 5 being coupled in.

The means 9 for reducing the light power, in the example embodiment selected here, comprises a combination of an acousto-optical filter (AOTF) 11 and a mechanical shutoff 12 designed as a shutter. The unit, AOTF 11 and mechanical shutoff part 12, placed between the laser light source 2 and the glass fiber 3 allows selection of individual or grouped laser lines, by the acousto-optical filter 11 and the shutoff 12 provided there, with the two components, AOTF 11 and mechanical shutoff 12, supplementing each other. An alternative arrangement of one part or the other is also conceivable.

It can also be seen from the figure that the out-coupling means 4 comprises a beam splitter, in the actual case here, a thin glass plate 13 or a thin glass beam splitter plate. Use of the out-coupling means 4 provides out-coupling of the primary laser light 5 in the range of 4% to 6%.

Finally, it should be noted that the overload protection according to the invention is ideally suited for use in confocal microscopy, that is, as overload protection for the glass fiber used to transmit the laser light. With the measures according to the invention it is possible to use stronger, and thus much more useful, multiline lasers without danger. The limitation of the laser light power increases the lifetime of the glass fiber without stressing the laser light source by switching means.

LIST OF REFERENCE NUMBERS

1. Beam path
2. Laser light source (light source)
3. Glass fiber (optical component)
4. Means for coupling out
5. Laser light (primary)
6. Beam path (of the light coupled out)
7. Detector
8. Evaluation unit
9. Means for reducing the light power
10. Optical system
11. AOTF
12. Mechanical shutoff part (shutter)
13. Thin glass plate

What is claimed is:

1. An overload protection system for avoiding damage to an optical component by excessive light power from a light source, said overload protection system comprising:

a housing unit installed between said light source and said optical component;

means on a beam path of said light source and housed within said housing unit for coupling out a proportion of light from said light source;

a light-sensitive detector arranged to detect said coupled out light and generate a signal indicating the intensity of said coupled out light;

an electronic evaluation unit for comparing said intensity signal to a presettable maximum value; and means connected to said electronic evaluation unit and housed within said housing unit for reducing the light power of light from said light source if said maximum value is exceeded.

2. The overload protection system according to claim 1, wherein said means for reducing light power from said light source directly dims said light source.

3. The overload protection system according to claim 1, wherein said means for reducing light power from said light source directly shuts off said light source.

4. The overload protection system according to claim 1, wherein said means for reducing light power from said light source includes a filter between said light source and said optical component.

5. The overload protection system according to claim 1, wherein said means for coupling out includes a beam splitter.

6. The overload protection system according to claim 5, wherein said beam splitter is a thin glass plate.

7. The overload protection system according to claim 1, wherein said means for coupling out serves to couple out from 4% to 6% of light from said light source.

8. The overload protection system according to claim 7, wherein said means for coupling out serves to couple out approximately 5% of light from said light source.

9. The overload protection system according to claim 1, wherein said detector is calibrated based on the intensity ratio of primary light from said light source to coupled out light.

* * * * *

UNITED STATES PATENT AND TRADEMARK OFFICE
CERTIFICATE OF CORRECTION

PATENT NO.    : 6,421,475 B1
DATED         : August 15, 2002
INVENTOR(S)   : Johann Engelhardt and Heinrich Ulrich It is certified that error appears in the above-identified patent and that said Letters Patent is hereby corrected as shown below:

<u>Column 4,</u>
Lines 15-16, "a housing unit installed between said light source and said optical component" should be deleted
Lines 17-18, "and housed within said housing unit" should be deleted
Lines 26-27, "and housed within said housing unit" should be deleted
Line 29, -- ,wherein the means for reducing the light power includes a combination of a mechanical shutter and an acousto-optical tunable filter -- should be inserted after the word "exceeded"
Lines 37-38, "said means for reducing light power from said light source includes a filter" should be deleted and -- the combination of the mechanical shutter and the acousto-optical tunable filter is placed -- should be inserted Signed and Sealed this Twenty-first Day of January, 2003

JAMES E. ROGAN
*Director of the United States Patent and Trademark Office*